United States Patent [19]

Bessey et al.

[11] Patent Number: 4,825,677
[45] Date of Patent: May 2, 1989

[54] METAL EXTRUSION APPARATUS

[75] Inventors: Guy Bessey, Auvers; Jean-Claude Aubonnet, Montbrison, both of France

[73] Assignee: Clecim, Courbevoie, France

[21] Appl. No.: 116,316

[22] Filed: Nov. 4, 1987

[30] Foreign Application Priority Data

Nov. 4, 1986 [FR] France ................................ 86 15349

[51] Int. Cl.⁴ ............................................. B21C 33/00
[52] U.S. Cl. ........................................ 72/270; 72/422
[58] Field of Search .......................... 72/254, 270, 422

[56] References Cited

FOREIGN PATENT DOCUMENTS

| 47938 | 3/1982 | European Pat. Off. . |
| 728357 | 11/1942 | Fed. Rep. of Germany . |
| 3120464 | 12/1982 | Fed. Rep. of Germany . |
| 660941 | 7/1929 | France . |
| 1261038 | 4/1961 | France . |

Primary Examiner—Lowell A. Larson
Attorney, Agent, or Firm—Pollock, Vande Sande & Priddy

[57] ABSTRACT

Apparatus for the extrusion of metal in the form of billets (4) cut to order from bars (44, 45) previously heated in a furnace (31), comprising an extrusion press (1) associated with a member for transferring each billet (4) to be extruded, parallel to itself, from a stand-by position (A), after cutting, to a loading position (C) in the axis of the press (1). For transfer of the billets the apparatus has a single member (2) moveable transversely to the extrusion axis and equipped with a gripper (5) of variable width, comprising at least two telescopic jaws associated with a device (6) for adjusting the extended lengths of the telescopic parts, such that each jaw covers a width substantially equal to the length of the billet.

10 Claims, 5 Drawing Sheets

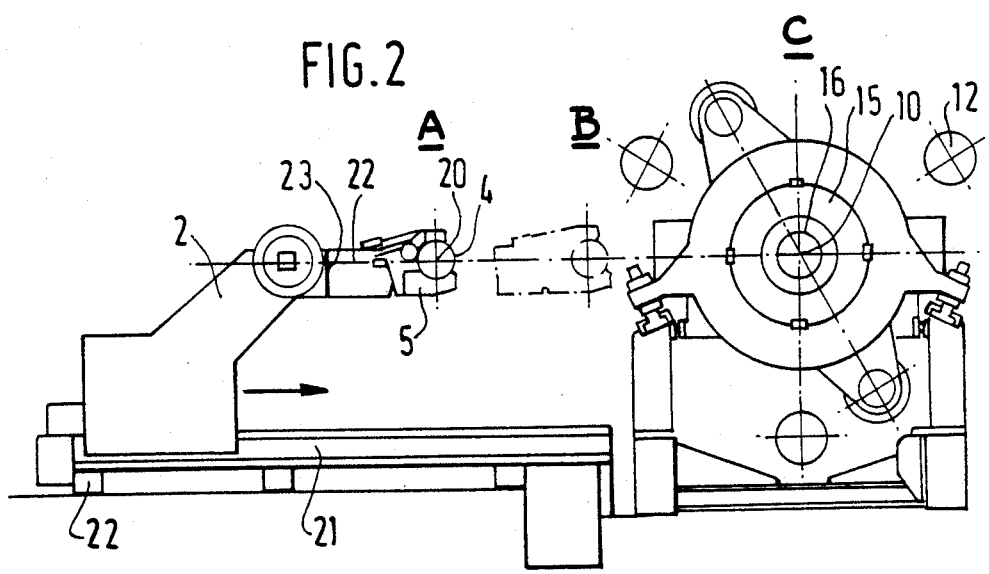
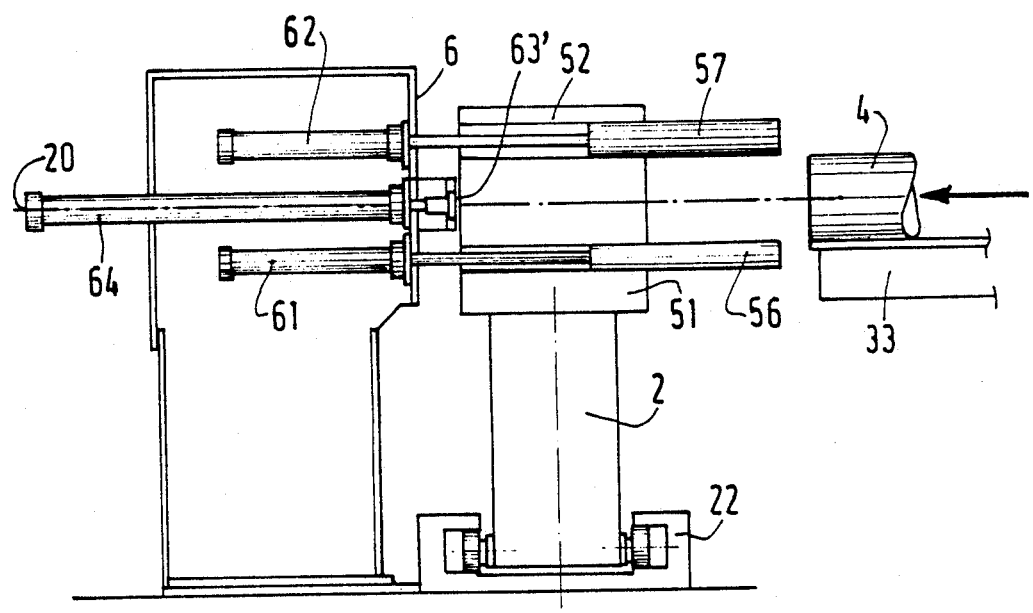

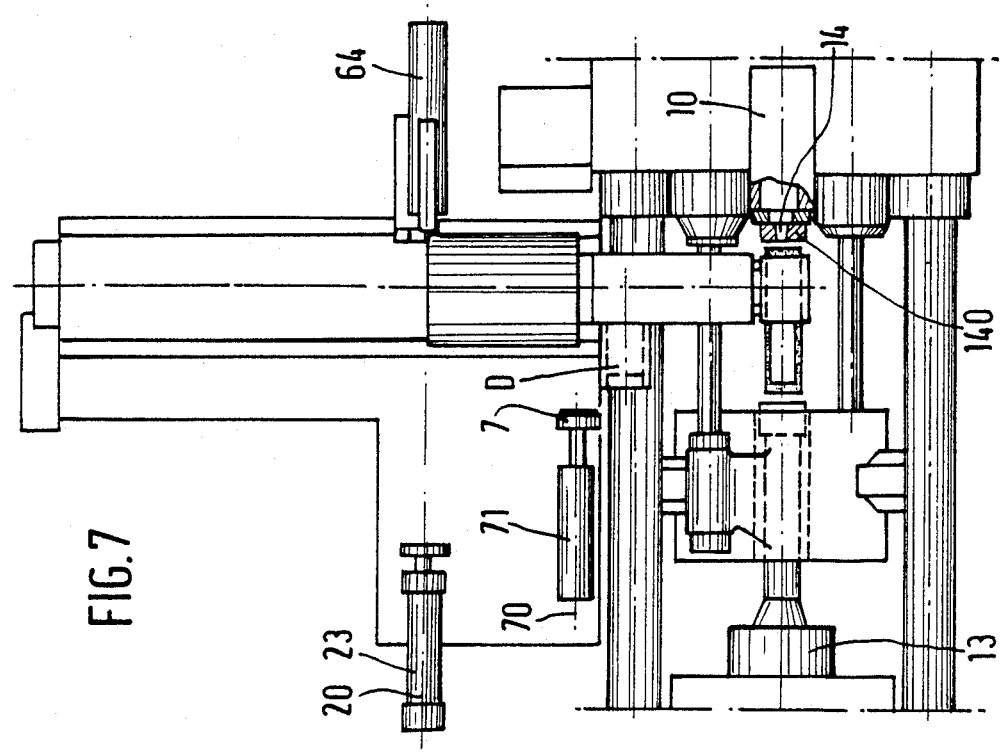
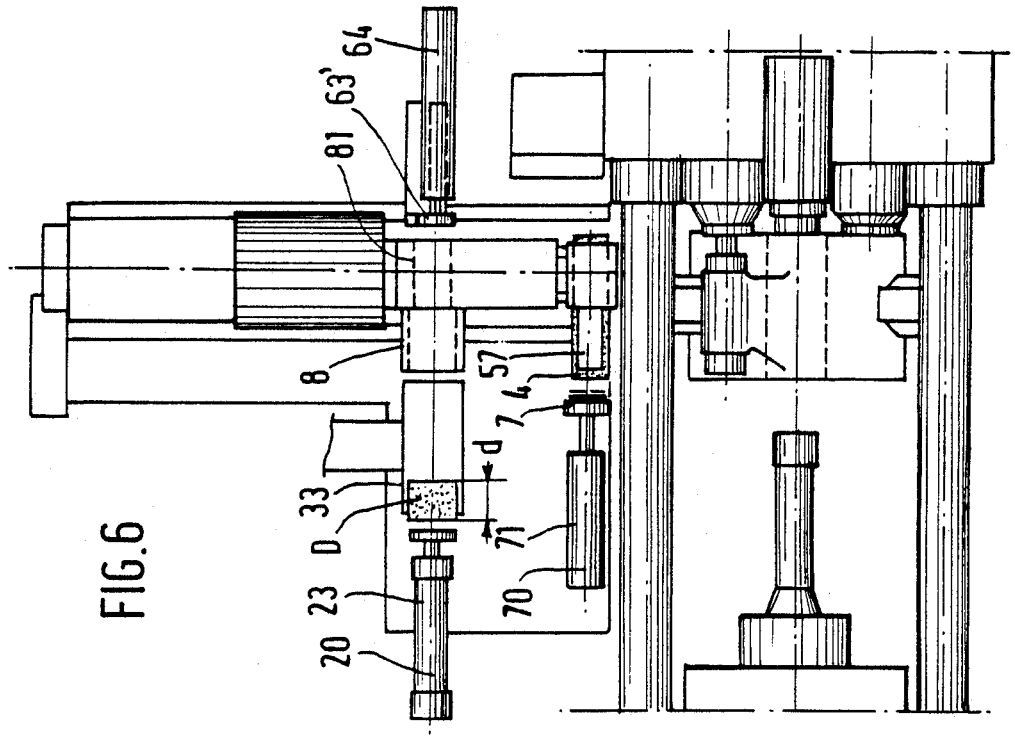

METAL EXTRUSION APPARATUS

FIELD OF THE INVENTION

The present invention relates to an apparatus for the extrusion of metal from billets cut to order.

BACKGROUND OF THE INVENTION

A metal-extrusion apparatus comprises essentially an extrusion press fed with pieces of metal to be extruded, called "billets", and consequently associated, on one side, with devices for preparing billets and, on the other side, with devices for discharging the extruded bars.

In general terms, the extrusion press comprises a crosshead connected, by means of columns, to a fixed cross-member and a moveable cross-member moveable in an extrusion direction under the action of the main jack bearing on the fixed cross-member. Located between the moveable cross-member and the crosshead is a container delimiting a tubular receptacle intended for the billet to be extruded and capable of being shut off at both its ends by means of two closing pieces, namely, a solid bottom, also called a dummy block, bearing on the moveable cross-member, and a die, also called a "die-body block", mounted on the support and bearing on the crosshead. The die defines the extrusion axis. Extrusion is caused as a result of the insertion inside the receptacle of an elongate rod of a length greater than that of the receptacle, called a "rammer" and carrying, at its end, one or the other of the closing pieces, depending on the extrusion method chosen.

In fact, a distinction can be made between two essential types of extrusion:

(1) direct extrusion, in which the container is stationary and bears on the crosshead carrying the die, the rammer bearing on the moveable cross-member and being equipped, at its end, with the dummy block which closes the container and which fits into the latter, thereby penetrating progressively into the receptacle in order to come nearer to the die, thereby causing the extrusion of the metal of the billet, and (2) reverse extrusion, in which the container bears on the moveable cross-member carrying the bottom of the container and slips onto a fixed rammer bearing on the crosshead and carrying the die-body block at its end facing the container, the container being moved towards the crosshead by means of the moveable cross-member, at the same time slipping onto the rammer, the latter being provided with an axial orifice for the discharge of the bar formed in this way.

The invention to be described can be used in either of the two types of extrusion press.

It is possible to feed precut billets of constant length to the press, but the quantity of extruded metal obviously depends on the size of the billet and therefore may not meet the particular requirements. Consequently, in some cases, it is preferable to cut the billets to order, so that each billet has a size corresponding substantially to the bar length to be extruded, taking into account the butt which, at the end of extrusion, always remains between the dummy block and the die-body block.

In this case, the metal to be extruded takes the form of bars or "bits" which are cut to order at one end, to form a billet of desired length. Since the billet also has to be heated to the extrusion temperature, it is expedient to convey the metal bars through a heating furnace, at the end of which are located shears making it possible to cut billets of variable length matching the product length to be extruded. The shears themselves comprise means for holding the billet in a stand-by position after cutting and means for moving the cut billet from the stand-by position up to a position for loading into the press centered on the extrusion axis.

Normally, the bar heating furnace and the shears associated with it are placed next to the press, and the billet is transferred parallel to itself from the stand-by position to the loading position in a direction of movement transverse relative to the extrusion axis.

The means of holding the billet in the stand-by position often consist of a chute-like scoop which is associated with the shears and which supports the end of the bar during cutting and then assumes the stand-by position, for example as a result of a tilting movement.

Various means are used to ensure that the billet is transferred from the stand-by position to the loading position. For example, the scoop located at the outlet of the shears can discharge the cut billet onto a transverse conveyor which delivers the billet to a bucket located at the end of an arm capable of subsequently tilting in order to place the billet in the extrusion axis. The transfer from the stand-by position to the loading device can also take place by means of a gripper mounted on a transversely moveable support. Because the furnace and the shears have to be arranged at some distance from the press, it has therefore seemed obvious hitherto to use two separate transfer devices, on the one hand a device which, as has been seen, consists of a conveyor or a simple chute which delivers the billet from the stand-by position after cutting to a take-up position nearer the press and, on the other hand, a loading arm equipped with a bucket which, as a result of pivoting or a translational movement, transfers the billet from the take-up position to the loading position.

This handling of the billet by at least two transfer members via a take-up position increases the transfer times, but above all has disadvantages when the billet is in several pieces. In fact, as mentioned, it is often preferable to cut the billets to order from bars located in a heating furnace. The length of these bars does not normally correspond to an integral multiple of the length of the billet, and consequently, when the end of the bar is reached, the remaining piece can be either shorter than or longer than the normal length of the billet. If the remaining length is too small, this piece must be completed by an additional piece taken from the succeeding bar, and if the length is too great a small-size piece remains, and to avoid wasting this it has to be combined with an additional piece taken from the succeeding bar.

The transfer of a billet in several pieces from the stand-by position to the loading position presents difficulties, especially when the pieces are of small size, because they can assume a crosswise position in the various transfer members.

On the other hand, the billet must be introduced into the container axially and therefore, in the loading position, must be placed in a free space provided between one end of the receptacle and the corresponding closing piece. For this purpose, the bottom of its container or the container of the die-body block is moved aside axially, the billet being conveyed by the loading scoop into the space so formed and then being introduced inside the receptacle by sliding axially.

The press must therefore have an additional length, allowing the container to execute the movements necessary to provide the free loading space. However, the tendency in extrusion techniques is as far as possible to reduce the number and extent of the movements of the various components of the press, in order to reduce the overall time of the extrusion cycle, and moreover, in the light of the dimensions reached at the present time on extrusion presses, any decrease in the length of the press results in a considerable saving. Consequently, to reduce the length of the press, it has sometimes been proposed to slip the container onto the rammer, in such a way as to provide the free loading space between the rammer and the die, where direct extrusion is concerned, or between the rammer and the bottom of the container, where reverse extrusion is concerned.

To introduce the billet into the container, the latter can be held only at one end by means of the loading scoop, the other cantilevered end is then introduced into the receptacle of the container, and then, since the billet is held by the latter, the loading scoop can be withdrawn and the billet introduced into the receptacle by means of a loading jack or the rammer or as a result of the movement of the container.

It is quite clear that such a method of loading cannot be used when the billet consists of two separate pieces.

In another loading method, after the billet has been placed in the free space between the closing bottom of the container and the die-body block, these two components are controlled so as to be brought nearer to one another, the billet being gripped between them; the loading scoop can then be removed and the container shifted axially so as to slip onto the billet held in this way. Hitherto, it has not been possible to adopt such a loading method for a billet in two pieces which, with the devices used, could not be held in the extension of one another to slip easily into the receptacle of the container.

SUMMARY OF THE INVENTION

The object of the invention is an apparatus making it possible to solve these various problems and, in particular, making it possible to easily load a billet in several pieces.

However, the invention also has other advantages which will emerge during the following description.

According to the invention, the transfer of the billet from the stand-by position to the loading position is carried out in a single movement by means of a single transfer member moveable transversely relative to the extrusion axis and carrying a gripper of variable width, capable of keeping the billet clamped over its entire length between at least two telescopic jaws, each comprising a fixed part and a moveable part mounted slideably on the fixed part in a direction parallel to the axis of the billet, the said gripper being associated with means for adjusting the extended lengths of the moveable parts, so as to cover a width substantially equal to the length of the billet.

According to an especially advantageous characteristic of the invention, the free loading space left as a result of the axial sliding of the container between one end of the receptacle and the corresponding closing piece has an adjustable length limited, during each loading operation, to the length of the corresponding billet.

In a preferred embodiment, when, after shearing, the billet is held in a scoop or a chute associated with a longitudinal loading jack, in the stand-by position the gripper is placed on the side of the chute opposite the loading jack, in such a way that the bearing face of the lower jaw is in the extension of the chute, the billet passing from the chute to the gripper as a result of axial sliding under the action of the loading jack. Furthermore, the loading gripper is arranged in such a way that the fixed part of each jaw is set apart from the end of the chute a distance substantially equal to the maximum extension length of the moveable part, the latter being adjustable, for each jaw, by means of a thrust jack arranged in the axis of the moveable part on the opposite side to the chute, in such a way that the moveable parts can be extended fully up to the chute by means of the thrust jacks and then, during a first portion of the movement of the billet, held in this position because the pressure in the thrust jacks is maintained, until the billet has left the chute completely, the pressure in the thrust jacks then being released during a second portion of the movement, in the course of which the loading jack pushes back the billet and the telescopic parts until the billet encounters a stop which is located on the opposite side to the chute and the position of which corresponds to the loading of the billet on all the fixed parts of the jaws.

As a result of these arrangements, clamping is obtained over the entire length of the billet, even when this consists of two pieces, and because a single transfer member is used the billet remains clamped between the two jaws of the gripper from the stand-by position up to the loading position, in this position clamping between the two jaws of the gripper being replaced by gripping between the two closing members of the container, in such a way that the two pieces of the billet cannot to the same time move relative to one another, as a result of which the container can slip without difficulty over the two pieces held in the extension of one another in this way.

According to another advantageous characteristic, the billet transfer member can stop in an intermediate position which is located between the stand-by position and the loading position and in which the billet held clamped in the gripper is placed opposite a member for lubricating at least one of its faces.

Furthermore, in an especially useful embodiment, the single member for transferring the billets from the stand-by position to the loading position possesses, in addition to the clamping gripper, a chamber for holding in reserve, consisting of a cylindrical receptacle of an axis parallel to the extrusion axis and arranged on the transfer member at the rear of the clamping gripper in the direction of transfer.

Preferably, the axis of the reserve chamber is set apart from that of the gripper a distance equal to the distance separating the stand-by position from the lubricating position, in such a way that, when the billet held by the clamping gripper is in the lubricating position, the chamber for holding in reserve is in the axis of the standby position.

BRIEF DESCRIPTION OF THE DRAWINGS

In order that the invention may be more clearly understood, the following description of a particular embodiment is given by way of example and illustrated in the accompanying drawings.

FIG. 2 is a side view along the line II—II of FIG. 1.

FIG. 5 is a detailed view of the adjustment means associated with the clamping gripper.

FIG. 6 is a top plan view of the transfer member in the lubricating position and the position for holding stock in reserve for an incorrect cut.

FIG. 7 is a top plan view of the transfer member in the loading position.

DESCRIPTION OF THE PREFERRED EMBODIMENT

Figure 1:
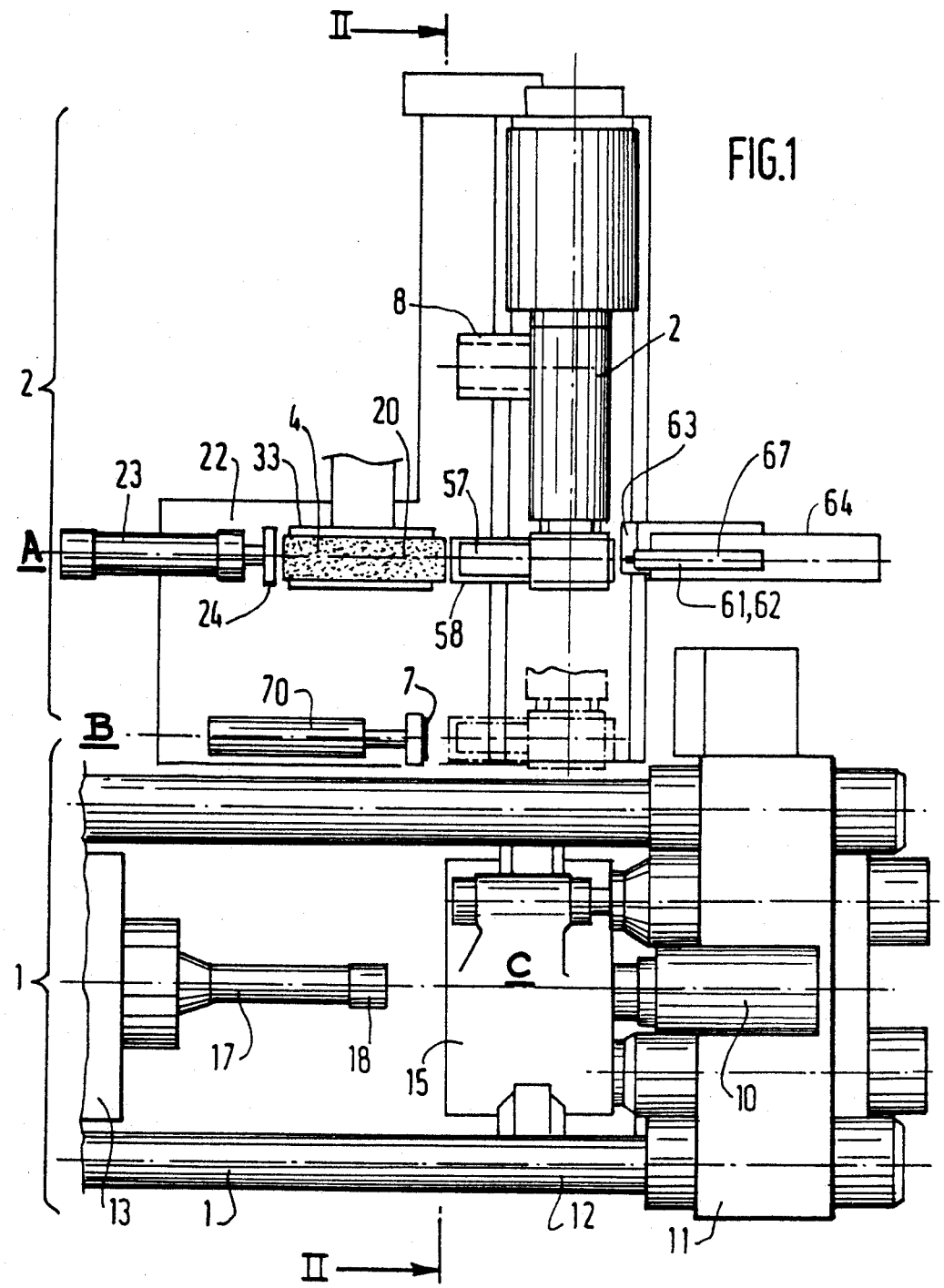
FIG. 1 shows diagrammatically a plan view of the apparatus according to the invention as a whole.

FIG. 1 illustrates as a whole an extrusion apparatus according to the invention which, as seen diagrammatically, comprises an extrusion press 1 and a transfer member 2, the bar heating furnace and the shears not being shown in this figure.

The extrusion press illustrated by way of example in all of the figures is of the direct type, but the arrangements described can be used on a reverse-extrusion press.

The extrusion press 1 shown in a plan view in FIG. 1 and in a side view in FIG. 2 therefore comprises a crosshead 11 connected by means of columns 12 to a fixed cross-member (not shown), on which bears a main extrusion jack determining the movement of the movable cross-member 13 along an extrusion axis 10.

A die 14 centered on the extrusion axis 10 and shown in detail in FIG. 7 bears on the crosshead 11 by means of a die-body block 140.

Arranged between the moveable cross-member 13 and the crosshead 11 is a container 15 which is mounted axially slideably between the columns 12, as can be seen in FIG. 2. The container 15 limits a cylindrical receptacle 16 open at both its ends on the two faces of the container and centered on the extrusion axis 10. On the same side as the crosshead 11, the receptacle 16 can fit over the die-body block 140.

On the other hand, the moveable cross-member 13 carries a rammer 17 consisting of a cantilevered rod carrying, at its end facing the container 15, a piece 18 which can slip into the receptacle 16 of the container 15, thereby closing the latter, and on the opposite face to that of the die 14. The closing piece 18 which, in reverse-extrusion presses, consists of a solid bottom is also called a dummy block. In fact, in direct-extrusion presses of the type illustrated in the figures, when a billet is placed inside the receptacle 16 of the container 15, the moveable cross-member 13 is brought nearer to the crosshead 11 by means of operating jacks (not shown), in such a way that the dummy block 18 slips inside the receptacle 16 which is thus closed at both its ends by means of the two closing pieces consisting respectively of the die-body block 140 and the dummy block 18, and then the main jack is actuated, this determining the penetration of the rammer 17 into the receptacle 16, together with extrusion of the metal of the billet through the orifice in the die 14, the section formed in this way being discharged along the extrusion axis 10 via a duct made in the fixed crosshead 11.

All these well-known arrangements have been shown only diagrammatically by way of example, and the invention can apply to presses of all types, with direct or reverse extrusion.

As mentioned, the extrusion press is associated with a bar heating furnace, itself equipped with shears at its outlet.

The shears comprise, in a conventionl way, a cutting blade and a support piece associated with a stop, of which the distance from the cutting plane can be adjusted so as to determine the sheared billet length. After cutting, the cut billet is placed on a device, such as a scoop, which holds it in a stand-by position. Usually, the holding scoop itself forms the piece supporting the billet during cutting, and it is mounted on the end of an articulated arm which, by pivoting, causes the scoop to change from a cutting position in the axis of the shears to a stand-by position, from which the cut billet can be taken up by other members, in order to be transferred into the loading position. All these devices can be various known types and therefore have not been shown in the figures which merely indicate diagrammatically the furnace outlet scoop 33 which assumes a stand-by position A, in which the billet 4 is centered on an axis 40 parallel to the extrusion axis 10.

Figure 3:
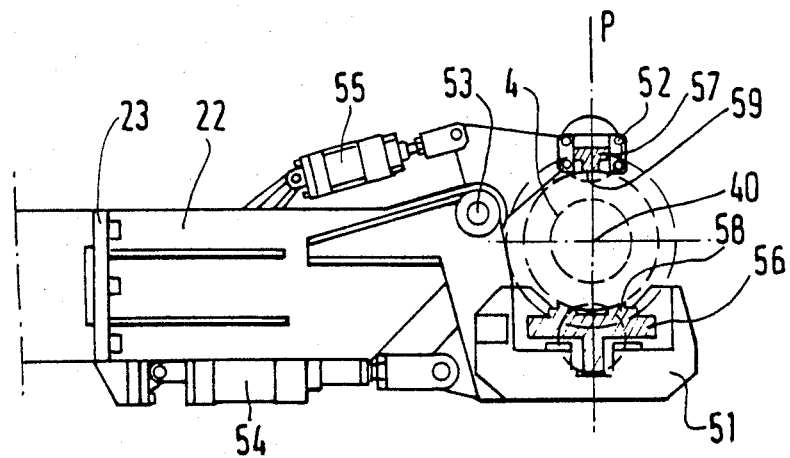
FIG. 3 and FIG. 4 are respectively a detailed side view and a detailed top plan view of the clamping gripper.
Figure 4:
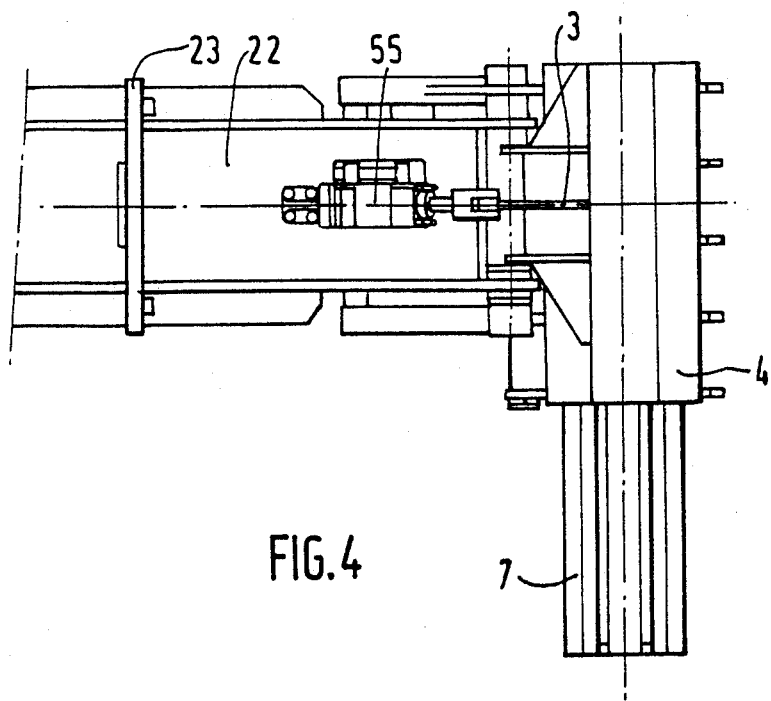

The billet transfer member illustrated in FIGS. 1 and 2 comprises a supporting carriage 2 which is mounted on rails 21 so as to slide perpendicularly to the extrusion axis 10. A supporting arm 22 is fastened to the carriage 2, for example by means of a fastening plate 25 shown in FIGS. 3 and 4. A clamping gripper 5 is mounted on the end of the arm 22. As can be seen in FIGS. 3 and 4, the gripper 5 comprises a lower jaw 51 and an upper jaw 52 which are each articulated about a pivot axle 53 which can be the same for both jaws. The pivoting of the two jaws is controlled by jacks 54 and 55, of which one element means on the arm 22 and the other arm on the corresponding jaw at a point offset from the pivot axle 53.

The two jaws are made telescopic and therefore each comprise a fixed part 51, 52, on which a moveable part 56, 57 is mounted so as to slide in a direction parallel to the axis 40 of the billet.

Preferably, the fixed part 51 and the moveable part 56 of the lower jaw each have a bearing face consisting of at least two rule-like profiled parts 58 arranged symmetrically relative to a vertical longitudinal plane P (FIG. 3), and the fixed part 52 and the moveable part 57 of the upper jaw have a bearing face consisting of at least one rule-like profiled part 59 centered along the plane P.

Thus, the billet 4, whatever its diameter, is held perfectly along at least three generatrices, and the clamping pressure exerted by the jacks 54 and 55 takes effect over the entire length of the billet because of the telescopic assembly of the two jaws. As a result, the billet 4 is held perfectly in the clamping gripper, even if it consists of several pieces of relatively short length.

Of course, the dimensions of the jaws, in particular the relative positions of the pivot axle and of the profiled bearing parts are determined in such a way that, whatever the diameter of the billet, the axis 40 of the latter is always placed in the plane of symmetry P of the two jaws.

As shown in FIG. 2, the transfer carriage 2, by moving perpendicularly to the extrusion axis 10, can assume several positions, namely a stand-by position A, a lubricating position B and a position C for loading into the container.

In the stand-by position A (FIG. 1), the clamping gripper carried by the carriage 2 is arranged in such a way that the plane of symmetry P of the two jaws passes through the axis 20 of the holding scoop 33, when the latter is in the stand-by position after cutting, the two porofiled bearing parts 58 of the lower jaw 51 being in the extension of the bearing face of the holding scoop 33. Mounted on the frame 22 which supports the supporting carriage 2 is a double-acting thrust jack 23 which is centered substantially in the axis 20 and therefore the rod carries, at its end, a thrust plate 24 bearing on the billet 4 so as to cause the latter to slide from the holding scoop 33 onto the lower jaw 51 of the gripper 5.

However, the gripper 5 is associated, on the other hand, with a device 6 for adjusting the extended length of the moveable parts of the two telescopic jaws. The adjusting device 6, likewise mounted on the frame 22 in the axis 20 and on the opposite side to the holding scoop 33 in relation to the gripper 5, comprises, in particular, two jacks 61, 62, shown especially in FIG. 5, which are capable of exerting a thrust parallel to the axis 20 by bearing respectively on the moveable parts 56 and 67 of the two jaws of the gripper 5.

Moreover, the adjusting device 6 has a stop 63, the position of which can be adjusted, if appropriate, and a jack 64 of which the function will be explained later.

The transfer of the billet 4 from the scoop 33 holding it in the stand-by position to the gripper 5 takes place in several steps shown diagrammatically in FIG. 8.

Figure 8A:
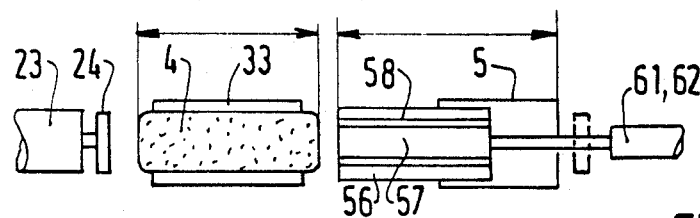
FIGS. 8 (a to e) shows diagrammatically the various steps in the loading of the billet onto the clamping gripper.
Figure 8B:
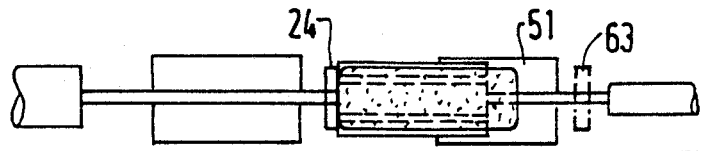

In a first step illustrated in FIG. 8a, when the carriage 2 has put the gripper 5 in the stand-by position the jacks 61, 62, at the end of their travel, push back the two telescopic moveable parts 56, 57 which, being fully extended, come to a short distance from the holding scoop 33.

The opening of the two jaws 51, 52 is adjusted by means of the jacks 54, 55, in such a way that, on the one hand, the bearing parts 58 of the lower jaw are in the extension of the bearing face of the holding scoop 33 and, on the other hand, the bearing part 59 of the upper jaw 52 is set only a slight distance away from the upper face of the billet. The billet 4 can then be pushed back by the jack 23, thereby sliding on the bearing parts 58. During the first portion of this sliding movement, the jacks 61, 62 are kept under pressure, so as to retain the moveable parts 56 and 57, against which butts the thrust plate 24 located at the end of the rod of the jack 23. The billet 4 is then loaded completely onto the lower jaw 51, 56 of the gripper 5 in the position shown in FIG. 8b.

The pressure in the jacks 61 and 62 is then released, and the billet continues to be pushed back by means of the jack 23, the two moveable parts 56, 57 being driven at the same time. This sliding persists until the front face 42 of the billet 4 comes to bear on the fixed stop 63 which is arranged so as not to interfere with the jacks 61, 62 and which, as seen in FIG. 5, can advantageously be located at the end of the rod of a jack 64 which is arranged between the adjusting jacks 61 and 62 and the function of which will be explained later.

Figure 8C:
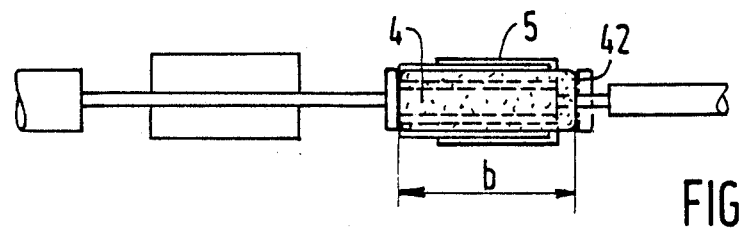

The movement of the billet and of the moveable parts 56 and 57 therefore stops in the position which is shown in FIG. 8c and in which the width of the clamping gripper 5 corresponds substantially to the length b of the billet 4, with the exception of the play necessary to ensure that the fixed stop 63 does not interfere with the clamping gripper 5 and the arm 22.

The two jaws 51 and 52 are then clamped by means of the jacks 54 and 55, and as mentioned the billet is held perfectly from this moment along three generatrices determined by the profiled parts 58 and 59 formed both on the fixed parts and on the moveable parts of the two jaws.

Figure 8D:
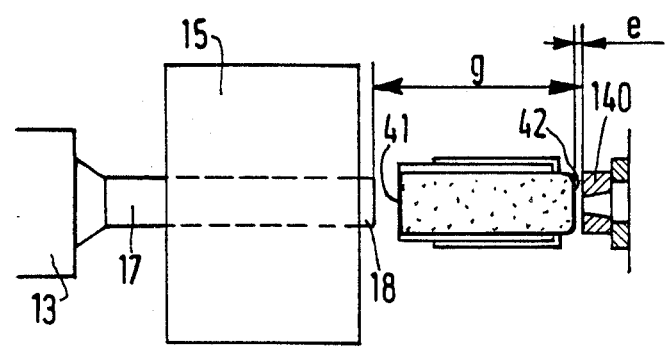

Since a single member for transferring the billet from the stand-by position to the loading position is used, the billet thus remains clamped over its entire length, until it is transferred into the loading position shown in Figure 8d. The stop 63 is positioned so as to leave between the front face 42 of the billet and the bearing face of the die-body block 140 a slight play which is necessary simply to allow the billet to move.

Figure 8E:
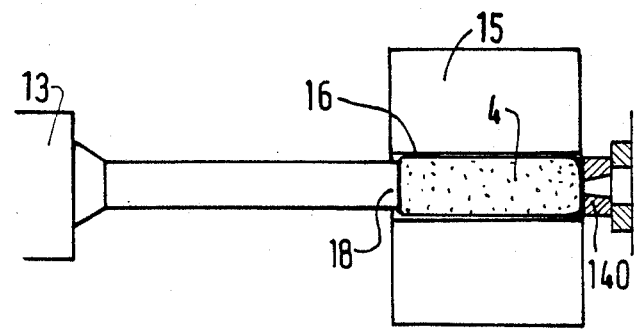

According to the known arrangement, in order to leave a loading space free between the dummy block 18 and the die-body block 140, the container 15 is slipped onto the rammer 17. However, according to one of the essential advantages of the invention, because the clamping gripper 5 has a width limited to the length d of the billet 4 because of the above described arrangements, it is possible to retract the moveable cross-member 13 relative to the fixed cross-member 11 just the distance necessary to leave between the opposing faces of the dummy block 18 and the die-body block 140 a distance g only a little greater than the length b of the billet, so that between each of the two faces 41 and 42 of the billet 4 and the corresponding closing piece there is the play e necessary simply to allow the billet to move. These plays have been enlarged in FIG. 8d. By controlling the moveable cross-member 13 so that it executes a slight movement, the billet 4 can thus be clamped between the dummy block 18 and the die-body block 140. The gripper 5 can then be opened and subsequently removed, and finally the container 15 is controlled so as to slide and slip over the billet, until it comes up against the fixed cross-member 11, as shown in FIG. 8e.

It will thus be seen that, from the stand-by position to the loading position inside the receptacle, the billet has always remained clamped perfectly over its entire length, thereby making it possible to transfer the billet and introduce it into the receptacle 16 under perfect conditions, even if the billet is in several pieces. On the other hand, the movement g of the moveable cross-member can be limited to just the length necessary, thus making it possible, on the one hand, to produce especially compact presses and, on the other hand, to limit the movements of the moveable cross-member to the length of the billet, so reducing the extrusion cycle because the movements of the moveable cross-member and of the container cannot be very fast. It is known that, in view of the production capacity of extrusion presses, even a very small time saving over the entire cycle can increase substantially the profitability of the press.

Moreover, because the billet, even in two pieces, is held over its full length during the entire transfer, there is the additional advantage that it becomes easier to lubricate the rear face of the billet.

In fact, it is known that, at the end of extrusion, there remain a metal butt between the dummy block and the die-body block and a sleeve which is integral with the butt and which has formed along the walls of the receptacle in the clearance necessarily existing between the dummy block and the receptacle. The butt adheres to the two closing pieces, between which it is crushed, and to make it easier to discharge the butt and sleeve it has been customary, for a long time, to use the so-called "coupled-block" technique, in which the dummy block is secured to the rammer 17, thus making it possible to dislodge it from the butt, thereby making it easier to recover the block. For this purpose, it is necessary to lubricate the face 41 of the billet in contact with the dummy block, to make it possible to dislodge the latter.

This operation, which is somewhat difficult in known apparatuses, especially when the billet is in several pieces, becomes easier as a result of the arrangements which have just been described.

In fact, the transfer carriage 2, during its movement from the stand-by position a to the loading position C (FIG. 2), can stop in an intermediate position B, in which the axis 40 of the billet coincides with the axis 70 of the jack 71, the rod of which is equipped, at its end, with a pad 7 saturated with lubricant. Since the billet remains held perfectly over its entire length by the two telescopic jaws of the clamping gripper 5, it is possible, in this position, to lay the pad 7 against the rear face 41 of the billet, without the fear of moving the latter, as shown in FIG. 6.

As mentioned, the apparatus according to the invention is especially suitable for handling billets in two pieces, which occurs particularly when bars passing through a tubular furnace in succession are sheared hot, and when the billet to be sheared consists of the rear end of the bar being cut and the front end of the following bar. However, even when the telescopic gripper according to the invention is used, it is necessary to avoid having to handle "small bits" of a length which is less than the minimum length and which is of the order of half the diameter. If, after a whole number of billets has been cut, the remaining length of the bar is of the order of half the length of the billet, and the two pieces have similar lengths both greater than the critical handling length. However, the remaining portion may also differ slightly, over or under, from the length of the billet, and cutting a normal length without precaution would then give rise to a "small bit" either at the rear end of the bar being cut or at the front end of the following bar. To avoid such a disadvantage, a modern apparatus usually incorporates an automatic control center which, by means of various known processes, can regulate the cutting of each bar so as to prevent "small bits" from occurring.

For example, in a known process, the scoop at the outlet of the shears is equipped with two parallel buckets, and when it is expected that a "small bit" will occur the remaining length of the bar is cut into two pieces long enough to be handled. The first piece is pushed onto one of the buckets, and then the scoop is shifted so as to place on it the second piece and an additional piece taken from the following bloom, in order to obtain a normal billet length. This billet in two pieces is transferred to the press, and the first remainder held in reserve is brought back into the axis of the shears, in order to complete it to the desired length by means of a second additional piece taken from the following bar.

The apparatus according to the invention is particularly suitable for the use of a such a process, not only because it makes it possible to handle a billet in two pieces, but also, according to an additional characteristic, because the transfer carriage 2 can be adapted for this purpose.

In fact, as can be seen in FIGS. 6 and 7, the transfer carriage 2 is equipped with a tubular chamber 8 arranged at the rear of the clamping gripper 5 in the direction of movement of the carriage, i.e., perpendicularly to the extrusion axis. Preferably, the axis of the chamber 8 is set apart from the axis of the telescopic gripper 5 a distance equal to the spacing between the stand-by position A and the intermediate lubricating position B, so that the chamber 8 is centered on the axis 20 of the stand-by position A when the carriage is advanced into the position for lubricating the billet held on the gripper.

The chamber 8 limits the cylindrical receptacle, the cross-section of which is a little larger than that of the billet and the length of which corresponds to the maximum length of the bar remainders, i.e., half the distance corresponding to the length of the billet, plus the minimum handling length.

Moreover, a fixed jack 64 is located on the frame 22 and centered on the axis 20 of the stand-by position on the side opposite the loading jack 23 in relation to the carriage 2. The rod of the jack 64 carries, at its end, a thrust plate 63' capable of entering an orifice 81 which is made inside the arm 22 and which, at the end of the stroke of the jack 64, can also form the stop for the billet.

This arrangement makes it possible to use the known process described above, a piece of billet being held in reserve not at the outlet of the shears on the holding scoop 33, but in the storage chamber 8 arranged on the transfer carriage 2. The piece held in reserve can then be cut in advance and not only from the last piece of the bar being cut.

In fact, when a comparison between the length of the bar and the length b to be given to the billet suggests that a "small bit" will occur, a piece D is cut in advance, the length of this piece D being, on the one hand, sufficient to ensure that this piece is stable and, on the other hand, determined so that, at the end of cutting, there remains a piece B1 which can be combined with a piece B2 of the following bar, to form a billet of length b, the two pieces B1 and B2 having lengths b1 and b2 sufficient to ensure that they are stable.

When the carriage 2 has stopped in the intermediate position shown in FIG. 6, the piece D placed on the scoop 33 is pushed back into the storage chamber 8, and the cycle continues.

The end of the bar is reached in this way, and the billet in two pieces B1 and B2 is placed in the extrusion axis.

In the meantime, as a result of the adjustment of the stop of the shears, an additional piece E has been cut, and this piece E, together with the piece D held in reserve, can form a billet of normal length, the lengths d and e of the two pieces D and E being such that $d+e=b$.

When the carriage 2 is returned to the rear into the position of FIG. 1, this piece E is transferred from the scoop 33 to the gripper 5, the moveable parts of which have been extended fully. The carriage 2 is then advanced into the intermediate position, and by means of the jack 64 piece D is brought back from the chamber 8 onto the scoop 33, the carriage 2 is then moved back once again, and by means of the jack 23 the piece D is transferred onto the gripper 5, the piece E being pushed up to the stop. The gripper 5 then carries the two pieces E and D which, because of the arrangements according to the invention, behave like a single billet.

It will be seen that, as a result of this arrangement, the piece D can be cut in advance, without waiting for the end of the cutting of the billet, and it is therefore preferable if the storage chamber 8 is limited by an insulating wall, so that the piece D retains its temperature as far as possible. Moreover, if need be, the chamber 8 could be equipped with a heating means.

Of course, as in the known process, it is also possible to wait for the end of the cutting of the bar before cutting the remaining part into two handy pieces. In fact, the invention is not limited to the details of the embodiment just described simply by way of example, but also embraces all the alternative versions remaining within the scope of protection defined by the claims.

Moreover, although the arrangements according to the invention have been described simply by way of example in relation to a direct-extrusion press, all the advantages of the invention would also be found in a reverse-extrusion press if the necessary detailed modifications were made.

We claim:

1. An apparatus for the extrusion of metal from billets cut to order, comprising
   (a) an extrusion press comprising a crosshead (11), a fixed cross-member and a moveable cross-member (13) moveable in an extrusion direction under the action of at least one main jack, and a container (15) delimiting a tubular receptacle (16) capable of being shut off at both ends by means of two closing pieces, namely, a solid bottom (18) bearing on said moveable cross-member and a die (14) mounted on a support bearing on said crosshead and defining an extrusion axis (10), one (18) of said closing pieces being located at an end of a rammer (17) capable of slipping inside said receptacle (16) in order to cause extrusion;
   (b) means for preparing metal billets of variable length (b), comprising means (33) for holding a billet (4) to be extruded in a stand-by position (A) in a direction parallel to said extrusion axis and offset laterally; and
   (c) a single member (2) for transferring the billet from the stand-by position (A) to a loading position (C) centered on said extrusion axis, said single member being movable transversely relative to said extrusion axis (10) and carrying a gripper (5) of variable width, capable of keeping the billet clamped over its entire length between at least two telescopic jaws (51, 52), each comprising a fixed part and a moveable part (56, 57) mounted slidably on said fixed part (51, 52) in a direction parallel to the axis of the billet, said gripper (5) being associated with means (6) for adjusting extended lengths of said moveable parts, so as to cover a width substantially equal to the length of the billet.

2. The extrusion apparatus as claimed in claim 1, wherein said single member consists of a carriage (2) moveable perpendicularly to said extrusion axis (10) between said stand-by position (A) and said loading position (C).

3. Apparatus according to claim 1, wherein a free loading space is left as a result of axial sliding of the container (15), between one end of said receptable (16) and the corresponding closing piece, said loading space having an adjustable length (g) limited, during each loading operation, substantially to a length (b) of the corresponding billet.

4. Apparatus according any one of the preceding claims, wherein said fixed part (51) and said moveable part (56) of said lower jaw have a bearing face consisting of at least two rule-like profiled parts (58) symmetrical relative to a vertical longitudinal plane (P), and wherein said upper jaw (52) has a bearing face consisting of at least one rule-like profiled part (59) centered on said longitudinal plane of symmetry (P).

5. Apparatus according to claim 1, wherein, with the means for holding the billet after shearing consisting of a scoop (33) associated with a longitudinal loading jack, in the stand-by position said gripper (5) is placed on one side of said scoop (33) and said loading jack (23) on the opposite side, such that a bearing face (58) of said lower jaw (51) is in the extension of said scoop (33), the billet passing from said scoop (33) to said gripper (5) as a result of axial sliding under the action of said loading jack (23).

6. Apparatus according to claim 5, wherein, in the position of maximum extension of said moveable parts (56, 57), said loading gripper (5) has a width substantially equal to the length of said receptacle (16) of said container (15).

7. Apparatus according to claim 5 or 6, wherein said means (6) for adjusting the extension length of said moveable parts (56, 57) comprise, for each jaw (51, 52), a thrust jack (61, 62) arranged in the axis of the corresponding moveable part on the opposite side to said scoop (33), means for supplying and maintaining pressure in said thrust jacks (61, 62) for extending said moveable parts (56, 57) up to said scoop (33) and for keeping them in this position during a first portion of the movement of the billet, until the latter has left said scoop (33) completely, and means for releasing pressure in said thrust jacks (61, 62) during a second portion of the movement of the billet, together with said moveable parts (56, 57), under the action of said loading jack (23), until the billet encounters a stop (63) located on the side opposite to said scoop (33) and the position of which corresponds to the loading of the billet on to all of said fixed parts (51, 52) of the jaws.

8. Apparatus according to claim 1, including means for lubricating at least the face of the billet turned towards said rammer (17), said means being located in an intermediate position (B) in the path of said loading gripper (5) between said stand-by position (A) and said loading position (C).

9. Apparatus according to claim 1 or 8, wherein said billet transfer member (2) comprises a chamber (8) for holding stock in reserve, said chamber consisting of a cylindrical receptacle having an axis parallel to said extrusion axis (10) and capable of being centered in the axis (20) of said stand-by position (A), in an intermediate position of said transfer member (2).

10. Apparatus according to claim 9, wherein the axis of the chamber (8) for holding stock in reserve is set apart from the axis of the telescopic gripper (5) by a distance equal to the spacing between said stand-by position (A) and said intermediate lubricating position (B).

* * * * *